2,606,987

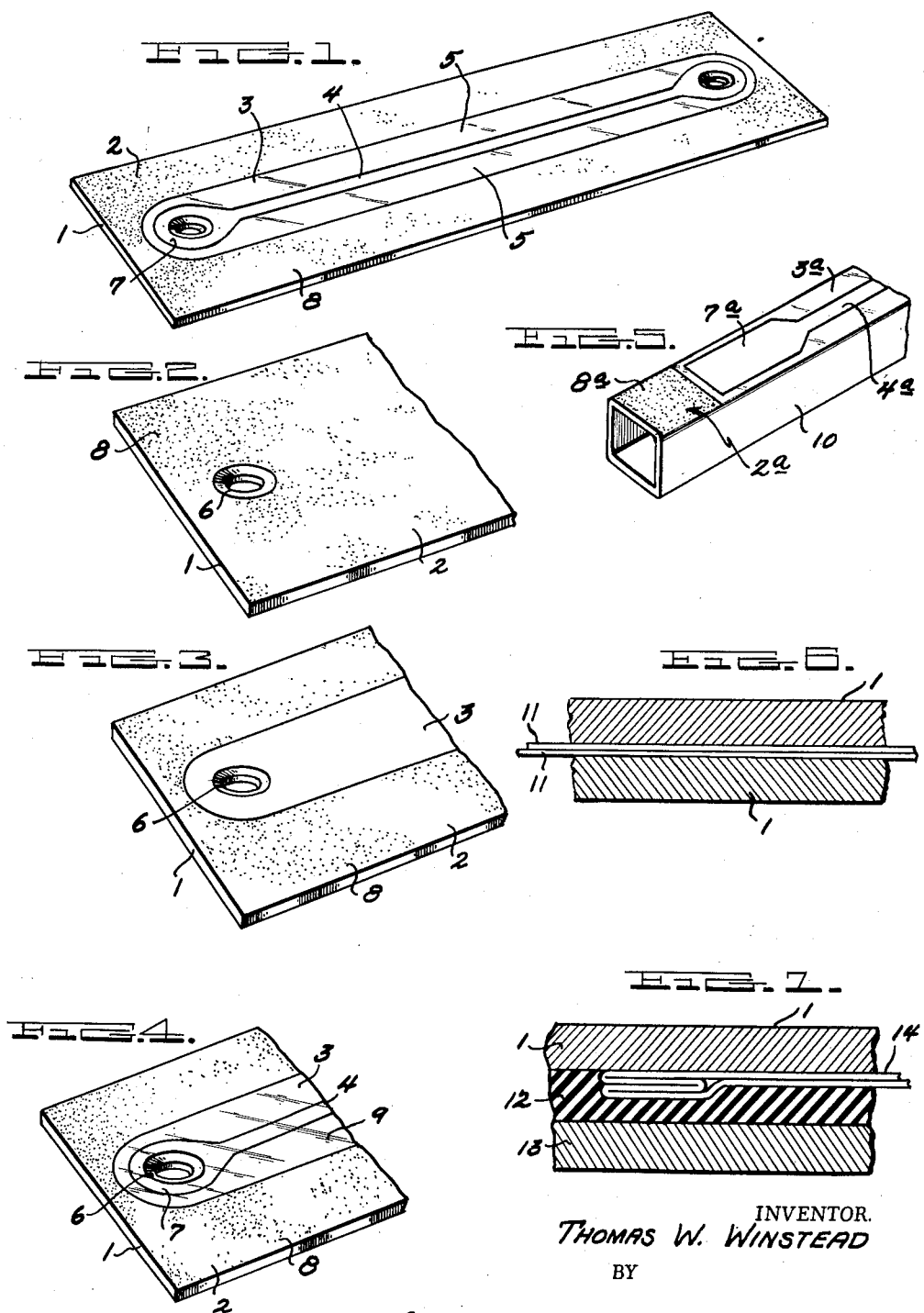
Aug. 12, 1952 — T. W. WINSTEAD — 2,606,987
HEAT SEALING ELEMENT FOR THERMOPLASTIC FILM
Filed June 14, 1949
INVENTOR.
THOMAS W. WINSTEAD Patented Aug. 12, 1952

UNITED STATES PATENT OFFICE 2,606,987

HEAT SEALING ELEMENT FOR THERMOPLASTIC FILM

Thomas W. Winstead, Baltimore, Md.

Application June 14, 1949, Serial No. 98,961

9 Claims. (Cl. 201—64)

This invention relates to apparatus for heat bonding or seaming thermoplastic sheets and films and to a method of making the apparatus. The present application is a continuation-in-part of my copending application Serial No. 716,-800, filed December 17, 1946 which issued as Patent No. 2,481,554 on September 13, 1949.

Heat seaming or bonding together films of thermoplastic material is accomplished by the application of heat and pressure to the area of the bond or seam. In practice it is found that the best bond is formed if: (1) the heat is applied at an optimum temperature and time for the particular material, (2) if the application of the heat is confined exactly to the area of the desired bond, (3) if the material, softened by the heat, is prevented from extruding from the bond area under the bonding pressure, and (4) if the material is cooled while under the bonding pressure. In this last regard it is important for rapid operation that the heat be dissipated rapidly.

Electronic heat bonding in which the thermoplastic film is to be bonded or subjected to a high frequency field between opposed electrodes, which also apply the bonding pressure, is used extensively. This method provides the above-enumerated factors necessary for good bonds and operates satisfactorily on most thermoplastic materials. The equipment is initially expensive, however, and the system is not satisfactory for use with some thermoplastic films such as polyethylene, which have very high dielectric strength. With such materials, the heat must be applied by conduction, and it has heretofore been customary to use a heated bar of metal as the bonding element. This system, however, has, among others, the disadvantage of slow cooling.

In the above-mentioned application, I have disclosed an electric resistance heat bonding device for thermoplastic films which consist essentially of a wound resistance element, preferably a flattened helix of conventional resistance wire or ribbon, laid in a shallow dovetail groove, which corresponds in area to the desired bond, in the working face of a pressure bar of metal of high heat conductivity. The resistance element is insulated from the walls of the groove by a thin layer of porcelain and a thin layer of porcelain covers the element and is faced off flush with pressure faces of the pressure bar on opposite sides of the heating element. The groove is very shallow and the porcelain layers quite thin, providing necessary insulation between the resistance wire and the bar with only a negligible loss in heat transfer from the resistance element. This device produces the factors enumerated above for a good bond, i. e., the heat is confined to the area of the bond, the heating surface is sandwiched between cool surfaces flush therewith to prevent extrusion of the heated plastic, the heating temperature and time can be accurately controlled, and the pressure bar removes residual heat from the resistance element with substantial rapidity.

In use, however, it was found that the overall efficiency of the above device was not at a maximum principally because of the fact that the mass (in terms of heat capacity) of conventional resistance wire is relatively large requiring an appreciable time—even though small by comparison with heated rod methods—to lose its residual heat. If the mass, i. e., heat capacity, of the heated element could be reduced, the cooling time and consequently the bonding time could likewise be reduced and the efficiency of the device raised.

The deposition of metals in thin films for electric conductors and resistors, known as "printed circuits," is extensively used in electronic apparatus and I have discovered that techniques employed in printed circuits can be utilized in the manufacture of resistance heat bonding devices for thermoplastic films which will improve the deficient characteristics of high heat capacity of the heating element disclosed in my prior application.

In printed circuit techniques the conductor or resistor materials are applied in several ways, such as painting or spraying, chemical deposition and cathode sputtering or evaporation. Any of these methods may be used in making my device, but I have found painting or spraying preferable because of cheapness and ease of handling. Further, conductor and resistor paints are readily available and may be applied easily through a silk screen stencil or by brushing or spraying.

At first thought, it would seem that a high resistance material such as powdered carbon, flake graphite, powdered nickel-chromium alloy, would be the logical material for a painted resistance heating element for bonding purposes. Experience showed, however, that both carbon and the high resistance metal alloys had more resistance and produced more heat than was desirable for the present purpose. It was further found that in order to reduce the resistance of such materials by increasing the section area, the mass (in terms of heat capacity) was found larger than would allow for cooling as fast as was desirable.

I discovered that if a metal having high electrical conductive characteristics, i. e., low resistivity, is used as the resistance pigment and painted on in a very thin coat, its resistance will supply the necessary bonding heat and its mass will be such that it will cool almost instantly when current is disconnected. Where used herein in reference to the resistance element "thin" means a dimension such that the mass (in terms of heat capacity) of the resistance element is negligible when the resistance is at optimum. Silver supplies these characteristics and is readily obtainable in very small form which can be applied with a glass flux ("flux" designating a binder rather than a cleansing agent) by either spraying or by silk screen stencil, and the cost of silver in the very small amounts used is very low.

An object of this invention is, therefore, to provide an inexpensive but efficient heat bonding device for thermoplastic films and sheets which will obviate some of the constructional and operational disadvantages of prior similar devices.

Another object of the invention is to provide an electrical heat bonding device for thermoplastic films and the like in which both the heating and cooling may be obtained almost instantaneously and which will produce strong bonds of exactly required dimensions without extrusion of the material from the area of the bond.

A further object of the invention is to provide an electrical resistance element for heat bonding device for thermoplastic films and the like in which the mass (in terms of heat capacity) of the resistance element is substantially negligible at optimum resistance.

A still further object of the invention is to provide a novel method of manufacturing electrical resistance heat bonding devices for thermoplastic films and the like.

Yet another object of the invention is to provide a heat bonding device for thermoplastic films and the like which comprises an electrical resistance element in the form of a thin film of low resistance metal having a face contour of the desired bond and painted on the working face of a pressure member of substantial heat capacity, said element having a very low mass (in terms of heat capacity) at optimum resistance and providing a heating surface adjoined on opposite edges thereof by cool pressure surfaces substantially flush with the heating surface.

With the above and other important objects and advantages in view the invention consists in the parts and combinations and procedural steps hereinafter set forth with the understanding that various changes may be made therein by those skilled in the art without departing from the spirit of the invention.

In order to make the invention more clearly understood, there are shown in the accompanying drawings preferred embodiments thereof by way of illustration.

In the drawings:

Figure 1 is a view in perspective of an electrical resistance heat bonding device according to one embodiment of the invention;

Figure 2 is a fragmental view in perspective of the base or pressure member of the device shown in Figure 1 illustrating a preliminary step in the manufacture of the device;

Figure 3 is a view similar to Figure 2 but showing a further step in the manufacture;

Figure 4 is a fragmental perspective view of one end of a device similar to that shown in Figure 1 but illustrating a modification thereof;

Figure 5 is a fragmental perspective view of another modification of heat bonding device according to the invention;

Figure 6 is a fragmental cross-sectional view, enlarged, showing the use of a pair of opposed heat bonding devices such as shown in Figure 1 bonding two superposed films of thermoplastic sheet; and Figure 7 is a cross-sectional view, enlarged, showing the use of one of the heat bonding devices according to the inventions in conjunction with a resilient counter-pressure member.

Referring more particularly to the drawings, there is shown in Figure 1 a heat bonding or seaming device according to one embodiment of the invention which comprises a base or pressure member 1 consisting of a block of metal of desired size and shape and having a pressure face 2. The base member 1 is conveniently made of iron or steel or other suitable metal having good heat conducting characteristics and has a substantial mass to give it substantial heat capacity. The pressure face 2 is surface contoured to the shape of the article to be bonded which will be flat in most cases of bonding or seaming together superposed films of thermoplastic, but which obviously may be of other contours such as the surface of a cylinder, cone, sphere, etc., according to the article being bonded. The base member is adapted for replaceable attachment to either the bed or the ram, or both, of a heat bonding press or jig (not shown) of conventional or suitable design.

Overlying the pressure face 2 of the base 1 and bonded thereto is a relatively thin layer of thermal resistant, electrical insulating material such as porcelain enamel which has a surface area greater than the area of the bond to be made by the device. Overlaying the layer of porcelain 3 is an electrical resistance element 4 which is composed of a very thin layer of metallic silver or similar metal of good electrical conductive property (low resistivity) and which has a plan contour corresponding exactly to the contour of the desired bond and which is firmly bonded to the surface of the porcelain layer. The resistance element 4 is placed on the porcelain layer 3 so that the surface of the porcelain extends beyond the opposite edges of the resistance element to provide pressure faces 5 respectively contiguous with the opposite edges of the element 4. The silver film for the resistance element 4 is applied in an extremely thin film (a few ten-thousandths of an inch thick) so that its exposed surface, for all practical purposes, may be considered to lie flush with the pressure faces 5.

In the typical example illustrated in Figure 1, the device is for forming a straight, relatively narrow bond or seam, and the resistance element is a straight strip, the exact width of the seam. It will be obvious, however, that the resistance element may be applied to the pressure surface 2 in any desired configuration, depending on the desired configuration of the bond to be formed. It may be noted here also that the technique of painting the resistance strip onto the pressure member lends itself admirably to the easy formation of heating surfaces of any desired configuration.

Electric leads may be conveniently connected to the resistance element 4 by drilling and counter-sinking the base member from the working face 2 at convenient locations adjacent the resistance strip, such as indicated at 6 at opposite ends of the resistance strip 4. The silver film 4 may be then extended over the area of the counterbores as indicated at 7 and flat head screws (not shown) placed in the counter-sunk apertures with the screw heads contacting the silver coated counterbores, and connector leads to a source of current then attached to the screws.

A preferred method of making the device shown in Figure 1 is as follows. A piece of good heat conductive metal for the base member 1 is chosen or formed for desired contour of the working face 2 and of a cross-section to provide a substantial mass. The terminal apertures 6 are now drilled and counter-sunk where desired, such as at the ends of the resistance strip to be later applied, and the working face 2, or portion thereof to receive the porcelain layer 3, is then slightly roughened, as indicated at 8 in Figure 2, such as by etching or sand blasting to prepare the surface for the reception of the porcelain. A thin coating of porcelain enamel is now applied to the roughened surface 8 over an area substantially greater than the area of the bond to be formed by the device. The piece is now fired and the coating of enamel fused onto the working surface 2. After cooling, the surface of the hardened porcelain may likewise be slightly roughened by sand blasting, if desired, to prepare this surface for the application of the resistance element.

The resistance element 4 is now painted onto the porcelain surface. The paint for this element is metallic silver, preferably in the form of minute flakes, and mixed with a glass flux such as lead borax silicate, and a suitable vehicle such as vegetable oil. This paint is applied to the porcelain surface in a pattern corresponding exactly to the contour of the desired bond either by spraying or by applying through a silk screen stencil or by other suitable methods which will result in a thin even coat. For straight strips, such as that illustrated, particularly where the strip is of appreciable length, spraying methods may be preferable. In more complicated patterns, silk screen methods will be found preferable.

In spraying, the spray jet is controlled by a suitable masking device to govern the width of the spray pattern and relative movement imparted to the base and/or spray gun at a constant rate and speed to control the thickness of the deposit. In silk screen stencilling, the screen is prepared in the customary manner to form the desired pattern for the resistance, and the paint is applied to the porcelain surface directly through the screen either by brush or spray gun. The counter-sinks 6 of the lead connecting apertures are also coated with a silver paint which is merged with the coating forming the resistance strip.

The silver paint coat is allowed to dry and the unit is again fired, this time at a temperature sufficiently high to melt the glass flux but not high enough to melt the silver or the porcelain layer. When the flux melts, the silver forms a smooth, very thin conducting film, the flakes of silver being held tightly to the surface of the porcelain by the flux. A minimum amount of the flux should be used in the mixture, just enough to bond the silver tightly to the surface of the porcelain without danger of flowing the flux and carying the silver particles beyond the painted area.

The device may be used just as above described with the resistance strip exposed. However, where the device is to be used extensively, it will be preferable to cover the resistance strip by a glaze such as a thin layer of the glass flux, referred to above, and which is fused over the surface of the resistance strip and the adjoining surfaces of the porcelain layer, such as shown in Figure 4. This glaze coating not only protects the silver film from damage, but also provides a smooth surface to the working face of the device and one to which the thermoplastic material does not adhere.

In the above described bonding device the mass of the pressure member 1 will be found sufficient to absorb and dissipate the heat in applications where use is more or less periodic with cooling periods between the periods of use. Where use is more or less continuous over extended periods, however, supplementary heat dissipation, such as by a moving stream of water, may be found advisable to maintain the pressure member cool. This may be provided by making the pressure member hollow as shown in Figure 5.

In Figure 5 the pressure member 10 is in the form of a tube of rectangular cross-section, one of its faces constituting the working face 2a. This device is made in the same manner described above, i. e., the working face 2a is first etched or otherwise roughened as indicated at 8a, and coated with porcelain enamel which is fused onto the face to provide the insulating coat 3a. The silver resistance film 4a is then applied in the manner set forth above to the shape of the desired bond and enlarged when necessary, as indicated at 7a, for connecting leads to the resistance. The working face of this device may also be finished by a thin coating of glass flux fused on as already described and shown in Figure 4. Suitable fittings, not shown, may be affixed to the tube 10 and connected with a source of running water so that a continuous flow of water through the tube is provided to carry off residual heat from the resistance element.

In use the bonding devices above described can be used on one side of the thermoplastic films being bonded with a suitable backing plate such as a simple metal plate or a compressible rubber sheet with a rigid backing, as shown in Figure 7, backing up the other side of the thermoplastic films. Alternately, and particularly in the case of relatively thick films, a pair of the bonding devices may be used as shown in Figure 6, one opposing the other with automatic resistance elements opposed and in accurate alignment one with the other.

Figure 6 illustrates the use of two opposed devices in forming a bond between two superposed plies of thermoplastic sheet 11. Figure 7 illustrates the use of a single bonding device forming a bond between superposed plies of thermoplastic film 14 which are backed up by a resiliently compressible pad of rubber 12 supported by a rigid plate 13. This latter arrangement will be found useful, particularly in cases where unevenness in thickness of the thermoplastic material occurs, such as in seaming the open end of the thermoplastic bag where the longitudinal edges of the bag are infolded in pleats as shown in Figure 7.

In practice, the pressure members 1 are mounted in a conventional or suitable bonding press or jig. When a single pressure member is used, it may be mounted either on the stationary bed of the jig or on the movable head or ram. In the case of opposed pairs of bonding devices, it will be mounted respectively on the bed and the head. The pressure member is secured to the jig in close contact therewith so that the metal of the jig serves to absorb and dissipate heat. The resistance leads referred to above are connected with a source of electric current through a suitable switch which may be either manually actuated or automatically operated by a suitable timing device which will open the switch after a pre-set time interval.

In operation the working face of the pressure member is brought into pressed engagement with the film to be bonded and current is applied momentarily to the resistance element which brings it to bonding heat. Its heat is conducted to the thermoplastic film which becomes fluid in the region of the element and the films are fused together under pressure. After sufficient time to bring the films to bonding temperature (which will vary according to the material and the thickness of the film—for example, one second) the current is shut off and the bond cooled while the material is still under pressure. As stated above, the heating element has very small mass (in terms of heat capacity), and the cooling is almost instantaneous, its small residual heat being immediately absorbed by the pressure member 1. It will be recalled, also, that the pressure member 1 has a substantial mass (in terms of heat capacity), and the device may be used for a number of operations and the pressure member remain relatively cool.

When the thermoplastic material is heated to bonding temperature, it is substantially fluid in the area of the bond. Extrusion of the material from the bond area is effectively prevented, however, because the area of he bond is confined under pressure by the two cooled pressure surfaces 5 flush with and bordering opposite edges of the resistance element 4.

From the foregoing it will be seen that I have provided an electrical resistance device for bonding thermoplastic films in which the heating element is composed of a metal of high electrical conductive property whereby its mass (in terms of heat capacity) is extremely low at optimum resistance so that it cools almost instantly after the current is turned off. The device is very simple to manufacture and is economical both in initial cost and in the cost of operation. It may be used with any thermoplastic film to form a strong bond to exact dimension with no extrusion of the material from the bond area which would otherwise cause weakening and detraction from the appearance of the bond.

I claim:

1. A method of making a device for heat bonding thermoplastic films comprising painting a mixture of a finely divided metal of a type characterized by low resistivity and a fusible flux in a thin film corresponding in contour to the desired bond on the pressure surface of a pressure member, and heating said film at a temperature to fuse the flux and bond the metal to said surface said pressure surface extending substantially beyond said thin film.

2. A method of making a device for heat bonding thermoplastic films comprising painting a mixture of a finely divided metallic silver and a fusible flux in a thin film corresponding in contour to the desired bond on the pressure surface of a pressure member, and heating said film at a temperature to fuse the flux and bond the silver to said surface said pressure surface extending substantially beyond said thin film.

3. A method of making a device for heat bonding thermoplastic films comprising painting a mixture of a finely divided metal of a type characterized by low resistivity and a glass flux in a thin film corresponding in contour to the desired bond on the pressure surface of a pressure member, and heating said film at a temperature to fuse the flux and bond the metal to said surface said pressure surface extending substantially beyond said thin film.

4. A method of making a device for heat bonding thermoplastic films comprising painting a mixture of finely divided metallic silver and a flux composed of lead borax silicate in a thin film corresponding in contour to the desired bond on the surface of a pressure member and heating the film at a temperature to fuse the flux and bond the silver to said surface said pressure surface extending substantially beyond said thin film.

5. A method of making a device for heat bonding thermoplastic films comprising applying a coating of porcelain enamel to a surface of a metallic pressure member, firing said member to vitrify the porcelain and bond the same to said surface, applying to the surface of the porcelain in a thin film corresponding in contour to the desired bond finely divided metal of a type characterized by low resistivity and mixed with a fusible flux having a lower fusing point than the porcelain, and again firing the member to fuse the flux and bond the metal to the surface of the porcelain the surface of the metallic pressure member extending substantially beyond said thin film.

6. A method of making a device for heat bonding thermoplastic films comprising painting a mixture of a finely divided metal of a type characterized by low resistivity and a fusible flux in a thin film corresponding in contour to the desired bond on the pressure surface of a pressure member, heating said film at a temperature to fuse the flux and bond the metal to said surface, covering at least said film with a thin coating of glaze, and heating the glaze to fuse the same and bond it to said film said pressure surface extending substantially beyond said thin film.

7. A method of making a device for heat bonding thermoplastic films comprising roughening the pressure surface of a heat bonding pressure member, applying a thin coating of porcelain enamel to said roughened surface, firing the member to vitrify the porcelain and fuse the same to said surface, applying to said roughened porcelain surface in a thin film corresponding in contour to the desired bond finely divided metal of a type characterized by low resistivity and mixed with a fusible flux having a lower fusing point than the porcelain, and again firing the member to fuse the flux and bond the metal to the surface of the porcelain said pressure surface extending substantially beyond said thin film.

8. A method of making a device for heat bonding thermoplastic films comprising roughening the pressure surface of a heat bonding pressure member, applying a thin coating of porcelain enamel to said roughened surface, firing the member to vitrify the porcelain and fuse the same to said surface, roughening the exposed surface of the porcelain coating, applying to said roughened porcelain surface in a thin film corresponding in contour to the desired bond finely divided metal of a type characterized by low resistivity and mixed with a fusible flux having a lower fusing point than the porcelain, and again firing the member to fuse the flux and bond the metal to the surface of the porcelain said pressure surface extending substantially beyond said thin film.

9. A device for heat bonding thermoplastic films comprising a pressure member of heat conductive metal and having a pressure surface, a thin coating of porcelain having an area substantially greater than the area of the desired bond fused onto said surface, a painted resistance heating element having a working face and bonded to the exposed surface of said coating with said exposed surface extending substantially beyond the edges of said working face, said painted resistance element being composed of a metal pigment characterized by low resistivity and applied in a film having a mass, in terms of heat capacity, which is substantially negligible at optimum resistance of the element, and means for connecting said element to a source of electrical current.

THOMAS W. WINSTEAD.

REFERENCES CITED

The following references are of record in the file of this patent:

UNITED STATES PATENTS

| Number | Name | Date |
| --- | --- | --- |
| 617,375 | Voigt et al. | Jan. 10, 1899 |
| 1,847,653 | Jones et al. | Mar. 1, 1932 |
| 1,881,444 | Flanzer | Oct. 11, 1932 |
| 2,119,680 | Long | June 7, 1938 |
| 2,134,870 | Fruth | Nov. 1, 1938 |
| 2,371,211 | Barrington | Mar. 13, 1945 |
| 2,434,560 | Gunter | Jan. 13, 1948 |
| 2,438,205 | Coates | Mar. 23, 1948 |
| 2,460,460 | Langer | Feb. 1, 1949 |
| 2,481,554 | Winstead | Sept. 13, 1949 |
| 2,509,439 | Langer | May 30, 1950 |